United States Patent [19]

Ueno et al.

[11] Patent Number: 4,717,269

[45] Date of Patent: Jan. 5, 1988

[54] ELECTRONIC TYPEWRITER

[75] Inventors: Hideo Ueno; Hiroshi Hattori, both of Nagoya, Japan

[73] Assignee: Brother Kogyo Kabushiki Kaisha, Aichi, Japan

[21] Appl. No.: 784,233

[22] Filed: Oct. 4, 1985

[30] Foreign Application Priority Data

Oct. 12, 1984 [JP] Japan ................................. 59-214884

[51] Int. Cl.⁴ ............................................. B41J 19/60
[52] U.S. Cl. ..................................... 400/51; 400/315; 400/369
[58] Field of Search ....................... 400/7, 51, 321, 314, 400/315, 316, 325, 369

[56] References Cited

U.S. PATENT DOCUMENTS 4,244,031 1/1981 Izushima et al. ..................... 400/7
4,323,888 4/1982 Cole ..................................... 400/51
4,490,055 12/1984 Johnson et al. ..................... 400/51

FOREIGN PATENT DOCUMENTS 2855918 6/1980 Fed. Rep. of Germany ........ 400/51
171982 10/1983 Japan .................................... 400/321

OTHER PUBLICATIONS

Durand, "Time Dependent ... Key Operation" IBM Technical Disclosure Bulletin, vol. 26, No. 3A, pp. 1128-1129, 8/83.

Barnes "Dual Speed Typamatic Keying" IBM Technical Disclosure Bulletin, vol. 26, No. 2, p. 708, 7/83.

Begnaert "Typamatic Feature ... " IBM Technical Disclosure Bulletin, vol. 22, No. 12, pp. 5504-5505, 5/80.

Primary Examiner—William Pieprz
Attorney, Agent, or Firm—Parkhurst & Oliff

[57] ABSTRACT

An electronic typewriter having a carriage which is automatically returned upon entering of space data through one operation of a space key on a keyboard, which space data is to be executed within an automatic-carriage-return zone which consists of a desired number of columns just before or up to the right-hand margin of the line of printing, comprising: a check device for checking whether printing data entered immediately after space data which causes an automatic carriage return is another space data or not; a timer which is started upon entering of the carriage-return space data; and a control device for comparing data of a time which is given by the timer when the above-indicated another space data is entered, with data of a predetermined reference time, and thereby executing the above-indicated another space data if the data of the time which is given by the timer is found to be beyond the data of the reference time, the control device neglecting the above another space data if the data of the time of the timer is not beyond the reference time.

8 Claims, 3 Drawing Figures

ELECTRONIC TYPEWRITER

BACKGROUND OF THE INVENTION

1. Field of the Art

The present invention relates to an electronic typewriter having a carriage which is automatically returned upon entering of predetermined carriage-return data such as space data or hyphen data through the corresponding key on a keyboard, if the carriage-return data is entered to be executed within a predetermined automatic-carriage-return zone which consists of a desired number of columns just before or up to the right-hand margin of a line of printing.

2. Related Art Statement

In making documents by means of an electronic typewriter, it is a common practice that a pair of successive space data are entered following period data at the end of a sentence in order to distinguish a space between sentences from a space between words of a sentence.

If the above typing method is used on an electronic typewriter having a function of executing an automatic carriage return, more specifically, if two sets of space data are entered in succession following period data as data to be executed within an automatic-carriage-return zone, the first space data causes the automatic carriage return operation. As a result, the second space data of the two is, against operator's will, executed to insert a space into the first column of a new line on a printing sheet of paper, whereby the beginnings of individual printed lines on the sheet of paper become uneven or indented unexpectedly.

To solve above problem, the existing electronic typewriters are designed not to execute the second space data if two sets of space data are entered in succession for execution within the automatic-carriage-return zone.

The above solution, however, has another problem which will occur when a certain number of space data are entered through a space key in order to insert the corresponding number of spaces at the beginning of a new line to open a paragraph. In other words, since space data is not executed when it is entered in the automatic-carriage-return mode, the number of space data which are executed at the beginning of a new line does not always correspond to the number of depressions of the space key. In order to open a new paragraph, therefore, it is required in the existing electronic typewriters that a desired number of space data be entered only after completion of the automatic carriage return operation. As a result, the existing electronic typewriters have a disadvantage of low typing speed.

SUMMARY OF THE INVENTION

It is therefore an object of the present invention to provide an electronic typewriter which has better performance by means of judging, upon entering of the first space data which causes an automatic return of the carriage, whether the second space data entered just following the first space data is for making a distinctive space between sentences or for inserting a space at the beginning of a new line.

According to the present invention, there is provided an electronic typewriter having a carriage which is automatically returned upon entering of space data through one operation of a space key on a keyboard, which space data is to be executed within an automatic-carriage-return zone which consists of a desired number of columns just before a right-hand margin of a line of printing, comprising: (a) check means for checking whether printing data entered through the keyboard immediately after space data which causes an automatic carriage return, is another space data or not; (b) a timer which is started upon entering of the carriage-return space data; and (c) control means for comparing data of a time which is given by the timer when the above-indicated another space data is entered, with data of a predetermined reference time, and thereby executing the above-indicated another space data, if the data of the time which is given by the timer is found to be beyond the data of the reference time, the control means neglecting the above another space data, if the data of the time of the timer is not beyond the reference time.

In the electronic typewriter of the present invention, upon entering of carriage-return space data, the timer is started to measure a time lapse after the entry of the carriage-return space data. Then, the check means checks whether printing data entered through a keyboard immediately following the carriage-return space data is another space data or not. In the case where this another space data is entered successively following the carriage-return space data, the control means compares the data of a time given by the timer, with the data of the predetermined reference time. In this case, if the former data is below the latter data, the control means judges that that another space data is entered in order to provide a space between sentences rather than a space between words of a sentence, and neglects that another space data. On the contrary, if the time lapse measured by the timer exceeds the reference time, the control means judges that that another space data is entered in order to insert a space at the beginning of a new line, and processes that another space data for executing it. Thus, the instant electronic typewriter permits an efficient typing operation, as well as overcomes the operational inconveniences experienced in the prior art in connection with the carriage-return space data.

It will be understood that the arrangement of the present invention relates to an operator's general tendency that the operator enters two successive spaces in a relatively short time, e.g., 0.5 second (predetermined reference time) when the operator terminates a sentence and starts a new sentence, while on the other hand the operator enters a desired number of spaces a relatively long time after the entry of a first space data (carriage-return space) at the end of a sentence when the operator wishes to provide these spaces at the beginning of the next line to indent the line to open a new paragraph.

According to one advantageous embodiment of the invention, a central processing unit and control data memory means, serve as the check means, the timer and the control means. The control data memory means stores programs necessary for controlling an automatic return of the carriage, and other operations of the typewriter.

According to another advantageous aspect of the invention, the typewriter comprises a random-access memory which serves as HOT-ZONE data memory means, input buffer means and print buffer means. The HOT-ZONE data memory means stores data representative of the automatic-carriage-return zone, and the input buffer means temporarily stores printing data entered through the keyboard. The print buffer means stores character and space data corresponding to the printing data stored in the input buffer means.

In accordance with a further advantageous embodiment of the invention, the typewriter comprises a read-only memory which serves as reference-time data memory means for storing data representative of the predetermined reference time. For example, the reference time may be set at 0.5 second. However, this reference time is determined based on the statistic data on a length of time in which ordinary typists complete the entry of two successive spaces through a keyboard when they wish to close a sentence and open a new sentence following the two successive spaces. The read-only memory also serves as the control data memory means.

BRIEF DESCRIPTION OF THE DRAWING

The foregoing and other objects, features and advantages of the present invention will become more apparent from reading the following detailed description of a preferred embodiment of the invention, when considered in conjunction with the accompanying drawing, in which.

DETAILED DESCRIPTION OF THE PREFERRED EMBODIMENT

Figure 1:
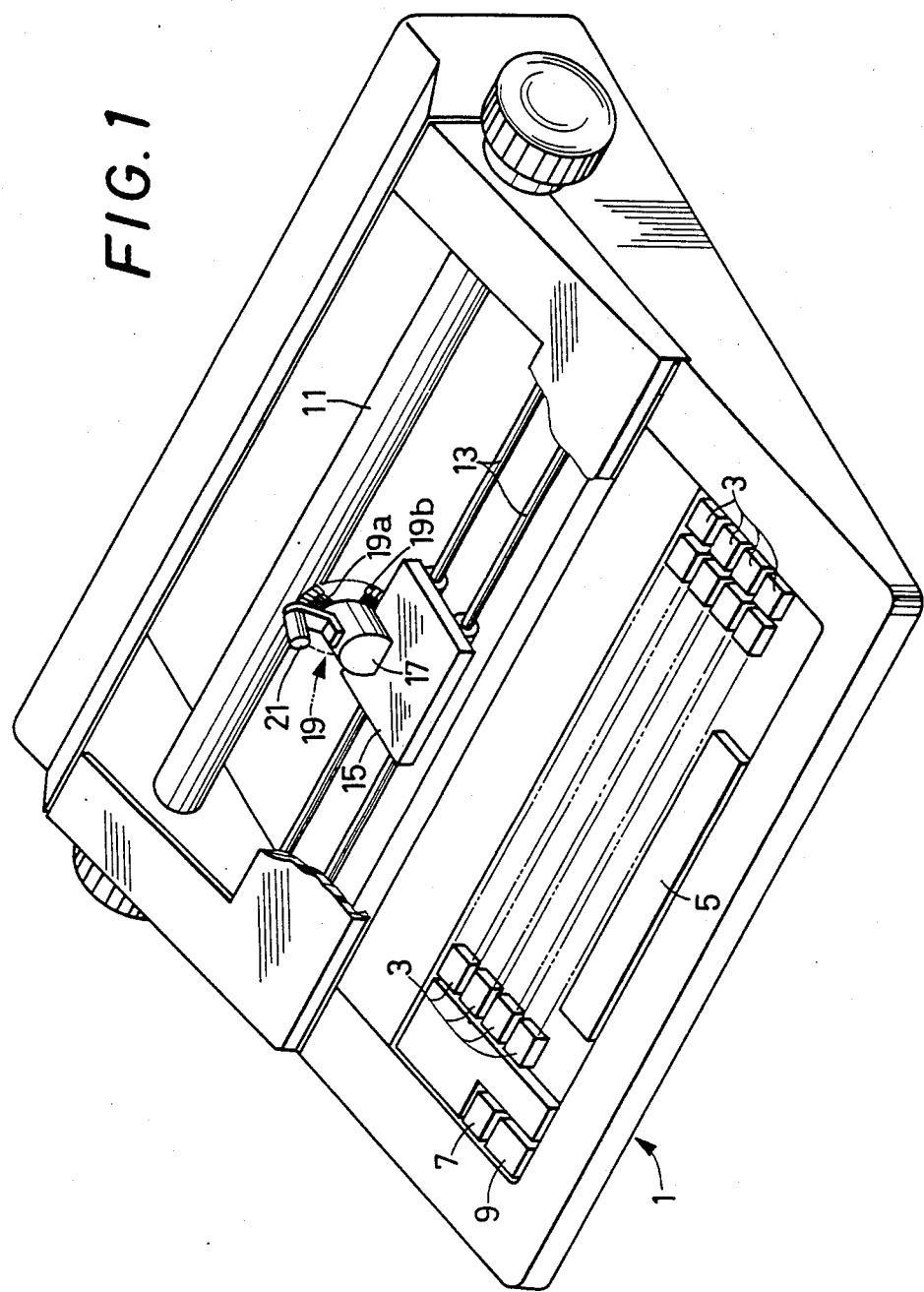
FIG. 1 is a view in perspective illustrating a general arrangement of a daisy-wheel type electronic typewriter embodying the invention.

There is shown in FIG. 1 a general arrangement of an electronic typewriter of the present invention, wherein a reference numeral 1 designates a keyboard, on which there are arranged a multiplicity of character keys 3, a space key 5 and a variety of function keys including a first key 7 and a second key 9. The first key 7 is for establishing an automatic-carriage-return mode in which an automatic carriage return operation is executed. The second key 9 is for entering data representative of an automatic-carriage-return zone (hereinunder called as "HOT-ZONE"). A platen 11 is rotatably supported on the frame of the electronic typewriter. The platen 11 is connected to a platen drive motor 69 (which will be described). With the platen drive motor 69 actuated, the platen 11 is rotated bidirectionally, i.e., in forward and backward directions in order to feed a sheet of paper (not shown) retained thereon. A pair of spaced-apart parallel guide rods 13 are secured to the frame, in parallel with the platen 11. A carriage 15 is slidably movably supported on the guide rods 13. The carriage 15 is connected to a carriage drive motor 63 (which will be described). With the carriage drive motor 63 actuated, the carriage 15 is reciprocated along a line of printing on the platen 11. The carriage 15 carries a wheel drive motor 17 such as a stepper motor. The wheel drive motor 17 has a rotary shaft, on which a daisy wheel 19 is attached in a removable or replaceable manner. The daisy wheel 19 has radial arms 19a, on the free ends of which a multiplicity of type-elements 19b are formed corresponding to the character keys 3. The wheel drive motor 17 is provided with a print hammer 21 thereon which impacts, against the platen 11, the selected type-elements 19b which have been brought at a predetermined printing position. The carriage 15 further carries a ribbon cassette (not shown) which accomodates an ink ribbon. The ribbon cassette is removable or interchangeable. The ink ribbon is stretched between the platen 11 and the type-element 19b at the printing position. With a ribbon drive motor 73 (which will be described) actuated, the ribbon is fed forward by a unit distance (one-character space) at a time.

Figure 2:
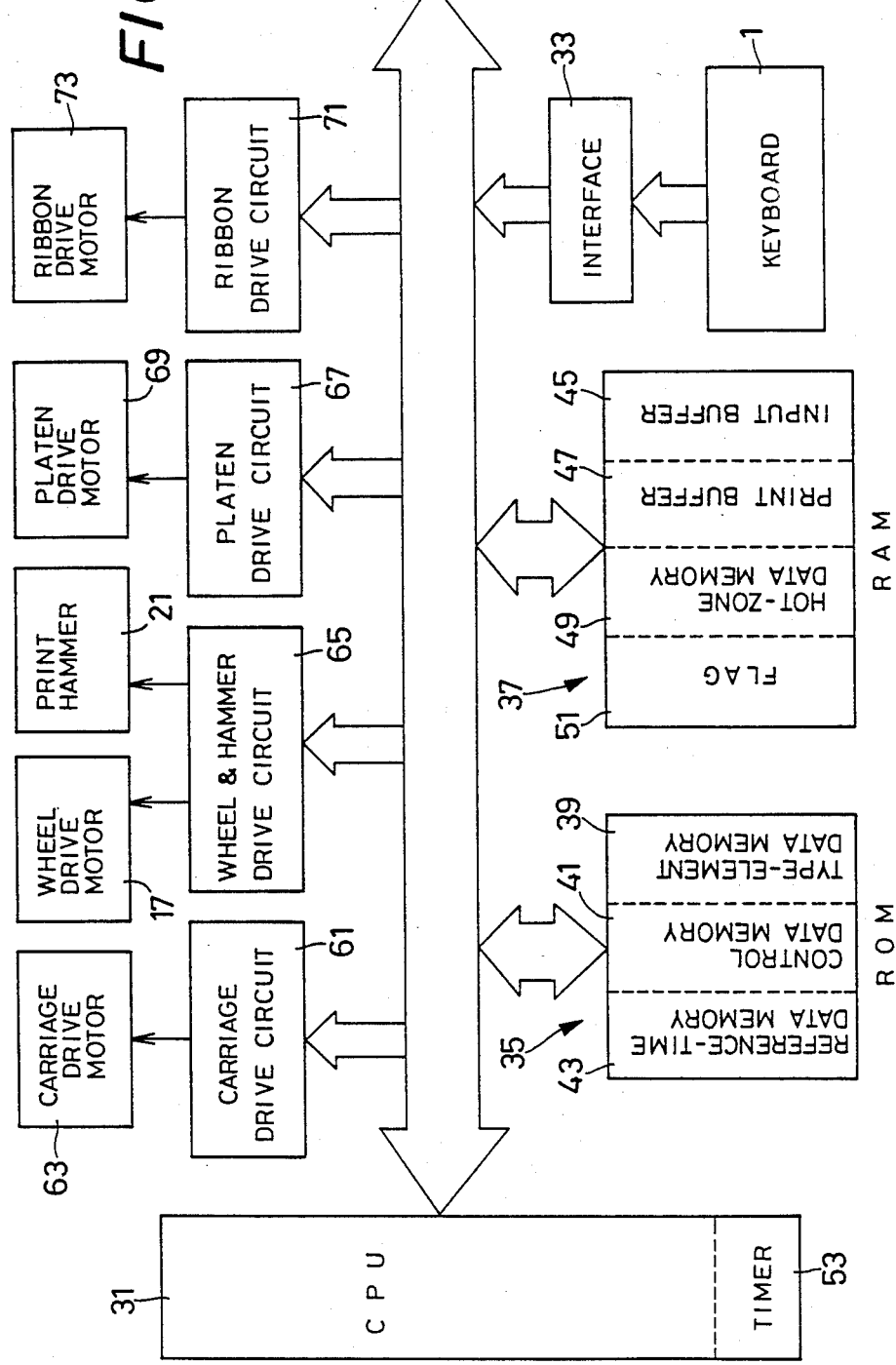
FIG. 2 is a block diagram showing an electrical arrangement of the typewriter.

Referring to FIG. 2, there will be described a control circuit which controls the instant electronic typewriter constructed as described above, wherein a central processing unit 31 (hereinafter referred to as "CPU 31") is connected to the keyboard 1 via an interface 33. A variety of data are entered by depressing a variety of keys arranged on the keyboard 1. The CPU 31 is further connected to a read-only memory (ROM) 35 and a random-access memory (RAM) 37. The ROM 35 is provided with a type-element data memory 39, a cotrol data memory 41 and a reference-time data memory 43. The RAM 37 comprises an input buffer 45, a print buffer 47, a HOT-ZONE data memory 49 and a flag 51. The type-element data memory 39 stores both of type-element selection data and type-element impact-force data. The type-element selection data permits the wheel drive motor 17 to be rotated by a desired number of steps so as to bring, into the printing position, the selected type-elements 19b corresponding to character data entered through the character keys 3. The type-element impact-force data causes the print hammer 21 to strike the selected type-elements 19b at the printing position by the corresponding force which is proportional to the area of the printing face of the selected type-elements 19b. The control data memory 41 stores programs for an automatic carriage return operation (which will be described in detail) and for printing and spacing actions. The reference-time data memory 43 stores data representative of a predetermined reference time, for example, 0.5 second. The reference time data is referred to by the CPU 31, upon entering of the first space data (carriage-return space data) which is to cause an automatic carriage return operation, in order to judge whether the second space data entered immediately following the first space data is to be executed to make the corresponding space or not. The input buffer 45 stores temporarily character data and space data entered through the character keys 3 and the space key 5, respectively. The print buffer 47 stores type-element data which are retrieved by the CPU 31 from the type-element data memory 39 according to the character data stored temporarily in the input buffer 45. The HOT-ZONE data memory 49 stores data representative of an automatic-carriage-return zone which consists of a desired number of columns just before or up to the right-hand margin of the line of printing. The carriage 15 is returned automatically, if space data entered through the space key 5 is to be executed within the HOT-ZONE. The flag 51 is set to "1", upon entering of the first space data which is to cause an automatic carriage return in the automatic-carriage-return mode which is established by the first key 7.

If printing data is entered and sent to the control circuit of the present electronic typewriter as a result of depression of the character key or space key, the CPU 31 first stores the character or space data temporarily in the input buffer 45. Then, the CPU 31 retrieves, according to the stored character data in the input buffer 45, the corresponding type-elemnt data in the type-element data memory 39. Further, the CPU 31 transmits the retrieved type-element data or the space data into the print buffer 47 and causes both of the wheel drive motor 17 and the print hammer 21 to be activated to print the corresponding character or space on the sheet of paper, whereby successive characters are printed, one character at a time. The CPU 31 comprises a timer 53 which is started upon entering of carriage-return space data to be executed within the HOT-ZONE, i.e., upon entering of space data which will cause an automatic return of the carriage 15. The CPU 31 serves as check means which checks if printing data which is entered through the keyboard 1 is space data or not. The CPU 31 also serves as control means which judges, upon entering of the first or carriage-return space data which is to cause an automatic carriage return of the carriage 15, whether the second space data entered successively following the first space data is to be executed or not, on the basis of results of comparing the data of a time which is given by the timer 53 when the second space data is entered, with the data of the reference the stored in the reference-time data memory 43. In other words, the CPU 31 checks to see if the second space data has been entered within the predetermined time interval after the moment when the first space data was entered.

The CPU 31 is connected to a carriage drive circuit 61 and causes, via the carriage drive circuit 61, the carriage drive motor 63 to be operated by a unit angle in response to every printing data (for each printing or spacing action), whereby the carriage 15 advances successively by a unit distance at a time, along the line of printing on the platen 11. The CPU 31 is further connected to a wheel & hammer drive circuit 65 which causes, in response to the type-element selection data from the print buffer 47, the wheel drive motor 17 to bring the selected type-element 19b into the printing position, and at the same time, causes the print hammer 21 to strike the selected type-element 19b with an inpact force represented by the corresponding type-element impact-force data. The CPU 31 is still furhter connected to a platen drive circuit 67 which causes, based on paper-feed data, the platen drive motor 69 to be rotated by a selected angle so as to feed the sheet of paper on the platen 11. The CPU 31 is also connected to a ribbon drive circuit 71 which causes, upon every printing action, the ribbon drive motor 73 to be actuated so as to feed an ink ribbon by a one-character space at a time.

Figure 3:
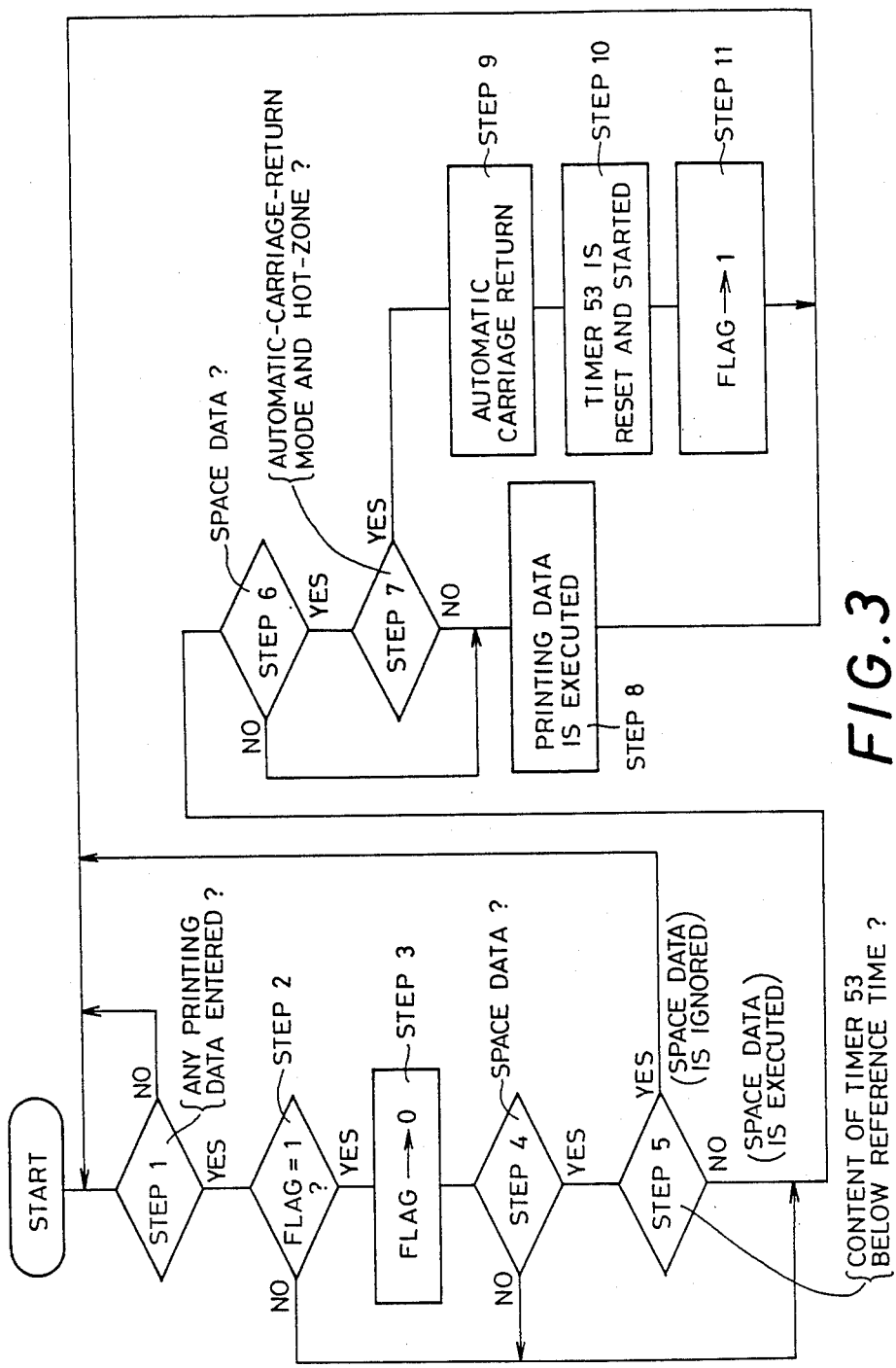
FIG. 3 is a flow diagram illustrating the steps of operation of an automatic carriage return and a normal printing and a spacing operation.

Referring to FIG. 3, there will be described the operation of an automatic carriage return which is started upon entering of space data which is to be executed within the HOT-ZONE under the automatic-carriage-return mode.

To begin with, the CPU 31 checks at STEP 1 whether there has been any printing data newly entered through the character keys 3 or the space key 5. In the case where there has been no data entered, the CPU 31 returns to START. Contrarily, in the case where there has been new data entered, the CPU 31 checks at STEP 2 whether the flag 51 is set at "1". If the new data is entered immediately after the first space data which is to cause an automatic carriage return operation, the flag 51 is set at "1". As a result, the CPU 31 resets the flag 51 to "0" at STEP 3, and goes to STEP 4. The CPU 31 checks at STEP 4 whether the entered printing data is space data or not. In the case where the data is space data (second space data), the CPU 31 compares at STEP 5 the current content of the timer 53, with the reference time data of the reference-time data memory 43, and thereby judges whether the second space data is entered within a length of the reference time. If the second space data is entered within the reference time after the entry of the first space data, the CPU 31 neglects the second space data and returns to START. Namely, the CPU 31 judges that the second space data has been entered in order to provide a space between sentences. On the contrary, if the second space data is entered after the reference time has passed, the CPU 31 proceeds with executing the second space data. That is, the CPU 31 judges that the second space data has been entered in order to provide a space at the first column of a new line, and goes to STEP 6. Back to STEP 2, unless the new printing data is entered immediately after the first space data, the flag 51 is at "0", and the CPU 31 goes to STEP 6. The CPU 31 goes to STEP 6, also when the checking in STEP 4 reveals that the entered printing data is not space data.

At STEP 6, the CPU 31 checks whether the printing data is space data or not. In the case where the data is space data, the CPU 31 checks at STEP 7 not only whether the automatic-carriage-return mode is established or not, but also whether the space data is to be executed within the HOT-ZONE or not. If the automatic-carriage-return mode is not established, and/or if the space data is not to be executed within the HOT-ZONE, the CPU 31 executes the space data at STEP 8, and returns to START. On the other hand, in the case where the checking at STEP 6 reveals that the entered data is not space data, the CPU 31 executes the printing data at STEP 8, and returns to START.

At STEP 7, if the automatic-carriage-return mode is established, and the entered space data is to be executed within the HOT-ZONE, the CPU 31 causes the carriage 15 to be returned to the left-hand margin of the line of printing and concurrently causes the platen drive motor 69 to feed the sheet of paper by a unit distance (one-line space) for changing lines at STEP 9. Also, the CPU 31 makes the timer 53 to be reset and newly started at STEP 10. Further, the CPU 31 sets the flag 51 to "1" at STEP 11, and returns to START.

As is apparent from the foregoing description, the CPU 31 checks each printing data which is received by the input buffer 45, in order to determine whether space data of the printing data should be transferred to the print buffer 47 for executing the entered space data. In this connection, it should be noted that the printing data which is currently executed based on the data in the print buffer 47 is different from the printing data which is currently entered through the keyboard 1 and received by the input buffer 45. More specifically described, a succession of printing data are stored in the input buffer 45 and transferred to the print buffer 47 as soon as the printing data are entered through the keyboard 1. However, the printing data are stored in the print buffer 47 before they are executed, that is, before the corresponding characters are actually printed, because of a time necessary for the printing of the corresponding characters and spaces by the printing mechanism (15, 21, etc.) while the carriage 15 is advancing. Accordingly, it is possible that the CPU 31 checks the printing data which are to be executed within the automatic-carriage-return zone (HOT-ZONE), while the printing is effected based on the previously entered printing data stored in the print buffer 47, namely, while the carriage 15 is located short of the automatic-carriage-return zone.

As discussed hitherto, the instant electronic typewriter embodying the invention does not execute the second space data of two successive space data if it is entered during a preset reference time after entering of the first space data of the two which is to cause an automatic carriage return operation, on the basis of judgment that the second space data is entered in order to clarify a space between sentences. Contrarily, the electronic typewriter executes the second space data if it is entered after the reference time, on the basis of judgment that the second space data is entered in order to insert a space at the beginning of a new line. Thus, the present electronic typewriter permits an efficient typing operation, as well as overcomes the operational incoveniences experienced in the prior art in connection with the carriage-return space data.

It is understood that the specific form of the invention herein shown and described is to be taken as a non-limiting example, and it is obvious to those skilled in the art that various changes and modifications may be made in the invention, in the light of foregoing teachings, without departing from the scope of the appended claims.

What is claimed is:

1. An electronic typewriter having a carriage which is automatically returned upon entering of space data through one operation of a space key on a keyboard, which space data is to be executed within an automatic-carriage-return zone which consists of a desired number of columns just before a right-hand margin of a line of printing, comprising:
    check means for checking whether printing data entered through said keyboard immediately after space data which causes an automatic carriage return, is another space data or not;
    a time which is started upon entering of said carriage-return space data; and
    control means for comparing data of a time which is given by said timer when said another space data is entered, with data of a predetermined reference time, and thereby executing said another space data so as to make a space at the first column in a new line of printing if the data of said time which is given by said timer is found to be beyond the data of said reference time, said control means neglecting said another space data if the data of said time of said timer is not beyond said reference time.

2. An electronic typewriter according to claim 1, wherein a central processing unit serves as said check means, said timer and said control means, said central processing unit being operated according to programs stored in control data memory means.

3. An electronic typewriter according to claim 2, wherein a random-access memory serves as HOT-ZONE data memory means, input buffer means and print buffer means, said HOT-ZONE data memory means storing data representative of said automatic-carriage-return zone, said input buffer means storing temporarily data entered through said keyboard, said print buffer means storing data, which have been processed by said control means according to said data stored in said input buffer means, for printing the corresponding character and space.

4. An electronic typewriter according to claim 2, wherein a read-only memory serves as said control data memory means and reference-time data memory means for storing data representative of said reference time.

5. An electronic typewriter according to claim 4, wherein said reference time is 0.5 second.

6. An electronic typewriter according to claim 1, wherein said electronic typewriter comprises a print head having a daisy type wheel.

7. An electronic typewriter according to claim 1, wherein said keyboard comprises a key for establishing an automatic-carriage-return mode in which said automatic-carriage-return operation is executed.

8. An electronic typewriter according to claim 1, wherein said keyboard comprises a key for entering data representative of said automatic-carriage-return zone.

* * * * *